*Z. Howe,*
*Broom Holder.*
*No. 110,917.* *Patented Jan. 10, 1871.*
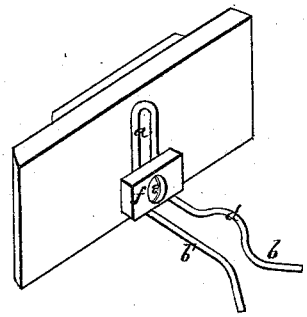
Witnesses
C. L. Evert.
A. A. _____
Inventor
Zadok Howe
per
Alexander Mason
Attys.

United States Patent Office.

ZADOK HOWE, OF LOWELL, MICHIGAN.

Letters Patent No. 110,917, dated January 10, 1871.

IMPROVEMENT IN BROOM-HOLDERS.

The Schedule referred to in these Letters Patent and making part of the same.

*To all whom it may concern:*

Be it known that I, ZADOK HOWE, of Lowell, in the county of Kent and in the State of Michigan, have invented certain new and useful Improvements in Broom-Holder; and do hereby declare that the following is a full, clear, and exact description thereof, reference being had to the accompanying drawing and to the letters of reference marked thereon, making a part of this specification.

The nature of my invention consists in the construction of a broom-holder from one piece of wire, bent in suitable shape, as will be hereinafter fully set forth.

In order to enable others skilled in the art to which my invention appertains to make and use the same, I will now proceed to describe its construction and operation, referring to the annexed drawing, which represents a perspective view of my broom-holder.

The broom-holder is made of one piece of wire, bent double at or about the center, forming the loop or double portion *a*.

The ends or tines *b b'* are then bent straight out at right angles with the double portion *a*. The tine *b* is bent so as to form the crook *d*, and the end then bent outward, as shown.

The tine *b'* is straight beyond or opposite the crook *d* and its end is also bent outward, so that the ends of the two tines form a flaring mouth, through which the handle of the broom is inserted. The handle is passed into the bend or crook *d* and held by the straight tine *b'*.

The broom-holder, thus constructed, is secured to the wall by means of a screw, *e*, and wooden-piece *f*. The portion *a* of the holder is placed flat against the wall, and the piece *f* laid on the same at the angle with the tines; the screw *e* is then passed through the piece *f*, between the wires and into the wall, which firmly secures the holder to the wall.

Having thus fully described my invention,

What I claim as new, and desire to secure by Letters Patent, is—

A broom-holder, made of one piece of wire in the manner herein described, so as to form the loop or double portion *a*, tine *b*, with its crook *d* and straight tine *b'*, the ends of said tines being bent outward, and the entire holder attached to the wall by means of the block *f* and screw *e*, substantially as herein set forth.

In testimony that I claim the foregoing I have hereunto set my hand this 2d day of June, 1870.

ZADOK HOWE.

Witnesses:
THOMAS J. SLAYTON,
LEONARD H. HUNT.